(12) United States Patent
Baek

(10) Patent No.: US 8,445,125 B2
(45) Date of Patent: May 21, 2013

(54) POUCH TYPE BATTERY

(75) Inventor: Woonseong Baek, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 354 days.

(21) Appl. No.: 12/923,562

(22) Filed: Sep. 28, 2010

(65) Prior Publication Data
US 2011/0171498 A1    Jul. 14, 2011

(30) Foreign Application Priority Data
Jan. 12, 2010  (KR) .................. 10-2010-0002633

(51) Int. Cl.
*H01M 2/06* (2006.01)
*H01M 2/10* (2006.01)

(52) U.S. Cl.
USPC ................ 429/7; 429/61; 429/90; 429/176

(58) Field of Classification Search .......... None
See application file for complete search history.

(56) References Cited

U.S. PATENT DOCUMENTS
2004/0115527 A1  6/2004  Hiratsuka et al.
2008/0054849 A1  3/2008  Kim
2009/0081537 A1* 3/2009  Kim ........................ 429/176
2009/0269620 A1* 10/2009  Kim ........................ 429/7
2012/0015217 A1* 1/2012  Lee et al. ............... 429/7

FOREIGN PATENT DOCUMENTS
| JP | 2006-073457 A | 3/2006 |
| KR | 10 2004-0027365 A | 4/2004 |
| KR | 2004-0062914 A | 7/2004 |
| KR | 10 2007-0101568 A | 10/2007 |
| KR | 10 2007-0109083 A | 11/2007 |
| KR | 10 2008-0020317 A | 3/2008 |

* cited by examiner

Primary Examiner — John S Maples
(74) Attorney, Agent, or Firm — Lee & Morse, P.C.

(57) ABSTRACT

A pouch type battery, including a pouch type bare cell having a terrace and having an electrode tab adjacent to the terrace, the terrace being an empty space defined where a sealing area of the electrode tab is not bent, the sealing area positioned in a direction in which the electrode tab extends, a protective circuit board electrically connected to the electrode tab, the protective circuit board positioned in the terrace and including a protection circuit, an upper case supporting the protective circuit board and encasing an upper portion of the bare cell, and a first barrier protruding downwardly from the upper case and electrically separating the protective circuit board from the electrode tab.

10 Claims, 4 Drawing Sheets

POUCH TYPE BATTERY

BACKGROUND

1. Field

Embodiments relate to a pouch type battery.

2. Description of the Related Art

In general, unlike primary batteries that are not rechargeable, secondary batteries are rechargeable batteries. Secondary batteries have come into widespread use for small, advanced electronic apparatuses, such as cellular phones, personal digital assistants (PDAs), notebook computers, and so on. For example, lithium secondary batteries operate at a voltage of 3.6 V and are widely used as a power source for electronic apparatuses, since the operating voltage of the lithium secondary battery is approximately 3 times higher than that of nickel-cadmium (Ni—Cd) batteries or nickel-hydride (Ni—MH) batteries, and since the lithium secondary batteries have a high energy density, i.e., a high amount of electrical power per unit weight.

A lithium secondary battery may employ a lithium-based oxide as a positive electrode active material and a carbon material as a negative electrode active material. In addition, the lithium secondary battery may have various shapes, such as a cylindrical shape, a prismatic shape, and a pouch shape.

A pouch type battery may include a pouch-shaped bare cell and a protective circuit module. The pouch-shaped bare cell may include, e.g., a jellyroll-type electrode assembly and a pouch accommodating the electrode assembly.

SUMMARY

It is a feature of an embodiment to provide a pouch type battery, which may be configured to reduce the entire length of the battery by placing a protective circuit module inside a terrace that is an empty space of a pouch-shaped bare cell.

At least one of the above and other features and advantages may be realized by providing a pouch type battery, including a pouch type bare cell having a terrace and having an electrode tab adjacent to the terrace, the terrace being an empty space defined where a sealing area of the electrode tab is not bent, the sealing area positioned in a direction in which the electrode tab extends, a protective circuit board electrically connected to the electrode tab, the protective circuit board positioned in the terrace and including a protection circuit, an upper case supporting the protective circuit board and encasing an upper portion of the bare cell, and a first barrier protruding downwardly from the upper case and electrically separating the protective circuit board from the electrode tab.

The bare cell may be a polymeric cell using a polymer as electrolyte.

The bare cell may include an electrolyte contained in a pouch, and the electrode tab may extend from inside the pouch to outside the pouch, the pouch being sealed around the electrode tab at the sealing area.

The electrode tab may be bent to be electrically connected to the protective circuit board.

The electrode tab may bend downward so as to fold back toward a bottom of the terrace, and bend sideways so as to extend along the bottom of the terrace.

The pouch type battery may further include a lower case encasing a lower portion and sides of the bare cell, and a second barrier protruding upwardly from the lower case so as to be located between the electrode tab and a first side end of the upper case. The second barrier may be coupled to the first side end of the upper case, the first side end of the upper case being located opposite to the terrace with respect to the electrode tab.

The lower case may be molded into the periphery of the bare cell to be integrally formed with the bare cell.

The electrode tab may bend downward so as to fold over an extending portion of the lower case and back toward a bottom of the terrace, and bend sideways so as to extend along a surface of the lower case and along the bottom of the terrace.

The electrode tab may include a bend of about 180 degrees where it bends downward, and the second barrier may protrude upwardly to a height that is greater than a height of the electrode tab at the bend of about 180 degrees.

The upper case may cover an uppermost portion of the second barrier.

At least one of the above and other features and advantages may be realized by providing a method of making a pouch type battery, the method including forming a bare cell, the bare cell including an electrode assembly disposed in a pouch and an electrode tab extending from inside the pouch to outside the pouch through a sealing area, molding a lower case to the bare cell, bending the electrode tab so that it is adjacent to a terrace formed in the bare cell, the terrace being an empty space defined where the sealing area of the electrode tab is not bent, the sealing area positioned in a direction in which the electrode tab extends, mounting a protective circuit board in the terrace of the bare cell, electrically connecting the protective circuit board and the electrode tab to one another, and encasing the protective circuit board and an upper portion of the bare cell with an upper case, a first barrier protruding downwardly from the upper case and positioned between the protective circuit board and the electrode tab so as to prevent an electrical short between the protective circuit board and the electrode tab.

BRIEF DESCRIPTION OF THE DRAWINGS

The above and other features and advantages will become more apparent to those of skill in the art by describing in detail example embodiments with reference to the attached drawings, in which.

DETAILED DESCRIPTION

Figure 1:
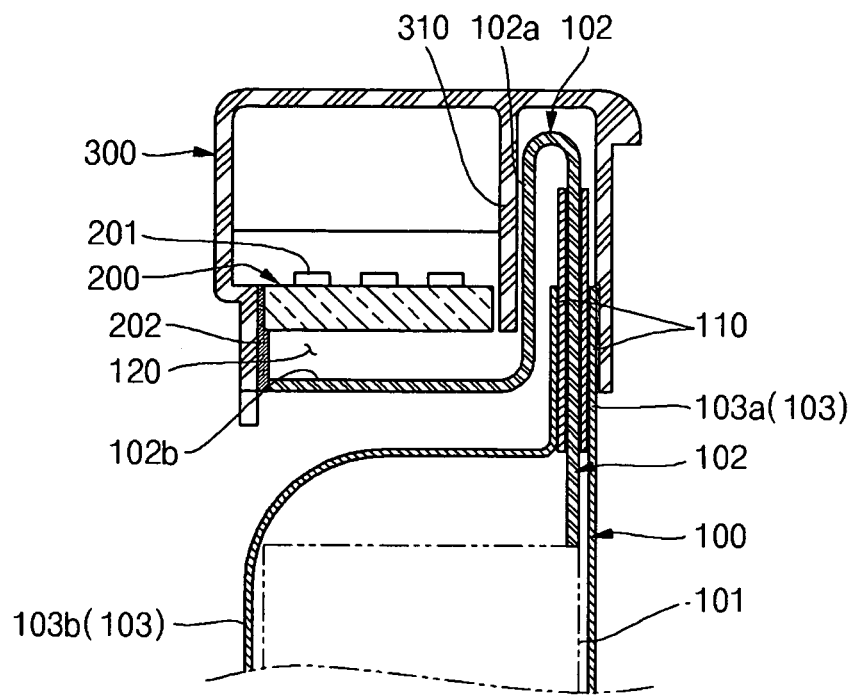
FIG. 1 illustrates a vertical sectional view of a pouch type battery according to a first embodiment.

Korean Patent Application No. 10-2010-0002633, filed on Jan. 12, 2010, in the Korean Intellectual Property Office, and entitled: "Pouch-Type Battery," is incorporated by reference herein in its entirety.

Example embodiments will now be described more fully hereinafter with reference to the accompanying drawings;

however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a vertical sectional view of a pouch type battery according to a first embodiment.

Referring to FIG. 1, the pouch type battery according to the first embodiment may includes a pouch type bare cell 100, a protective circuit board 200, an upper case 300, and a first barrier 310.

The pouch type bare cell 100 may include an electrode assembly 101, and a pouch 103 accommodating the electrode assembly 101.

The electrode assembly 101 may include a first electrode plate and a second electrode plate stacked or wound with a separator interposed therebetween. An electrode tab 102 may extend from a side of each electrode plate. The electrode assembly 101, in combination with an electrolyte, provides an electrochemical means to charge and discharge. In order to enhance stability, the bare cell 100 may be a polymeric cell using a solid-state polymer or gel-state polymer as electrolyte.

The pouch 103 may include an upper pouch film 103a and a lower pouch film 103b. The pouch may be formed such that the electrode assembly 101 is mounted in the pouch 103, and peripheral portions of the upper pouch film 103a and the lower pouch film 103b may be sealed to contain the electrode assembly 101 and electrolyte.

To electrically connect the electrode assembly 101 to an external device, respective electrode tabs 102 connected to each of the electrode plates of the electrode assembly 101 may be exposed to the exterior of the pouch 103 through a sealing portion 110.

The pouch 103 may include a terrace 120, the terrace 120 being an empty space of the bare cell 100 that is a portion formed when the sealing portion 110 is not bent. For example, the sealing portion 110 may be substantially flat where the pouch is sealed around the electrode tab 102, and the electrode tab 102 may be flat where it extends from the pouch 103.

The protective circuit board 200 may be a board on which various elements 201 are mounted to form a protection circuit. The protective circuit board 200 may form a protection circuit module together with the protection circuit. The protective circuit module may serve as a safety device for cutting off a circuit to break a current when an internal temperature of the battery rises or when a voltage of the battery abruptly increases due to overheating or overdischarging of the battery, thereby preventing the combustion or explosion of the battery.

The protective circuit board 200 may be electrically connected to the electrode tab 102 and may be provided inside the terrace 120. In order to electrically connect the protective circuit board 200 to the electrode tab 102 while mounting the protective circuit board 200 in the terrace 120, the electrode tab 102 may be bent. By forming the electrode tab 102 in a bent shape, it is not necessary to provide an additional conductor, such as a lead plate, between a connecting portion 202 of the protective circuit board 200 and the electrode tab 102, thereby reducing costs. In an implementation, as shown in FIG. 1, the electrode tab 102 may include a first bent portion 102a bent approximately 180 degrees downwardly, and a second bent portion 102b further bent approximately 90 degrees outwardly.

Along with a lower case 1500, described below in connection with the second embodiment, the upper case 300 may insulate and/or protect a core pack including the bare cell 100 and the protective circuit board 200. The upper case 300 may support the protective circuit board 200 while encasing an upper portion of the bare cell 100.

The first barrier 310 may protrude downwardly from the upper case 300 and electrically separates, i.e., disconnects, the protective circuit board 200 provided inside the terrace 120 from the electrode tab 102. Thus, the first barrier 310 provided between the protective circuit board 200 and the electrode tab 102 may help prevent an undesired electrical connection or short-circuit between the protective circuit board 200 and the electrode tab 102.

Hereinafter, a pouch type battery according to a second embodiment will be described with reference to FIGS. 2 and 7.

Figure 2:
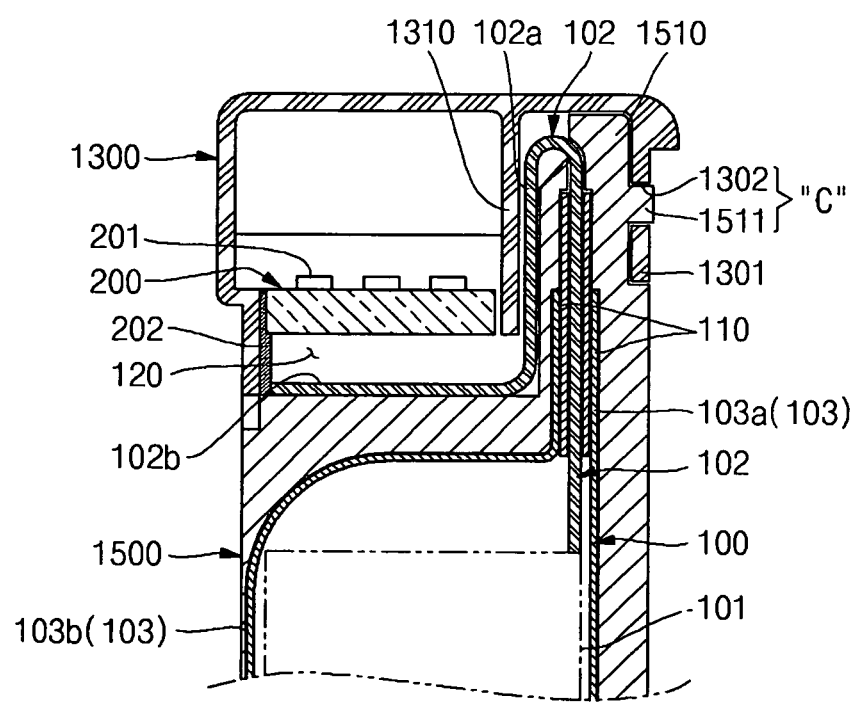
FIG. 2 illustrates a vertical sectional view of a pouch type battery according to a second embodiment.
Figure 7:
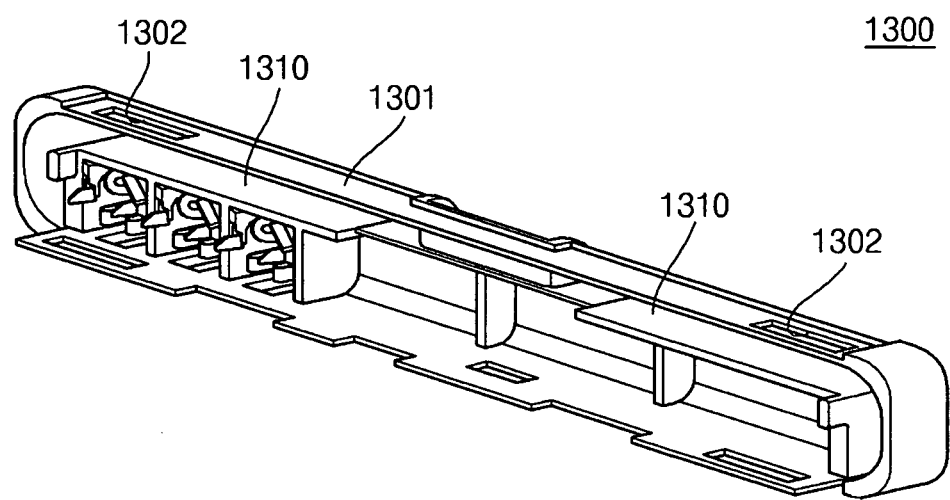
FIG. 7 illustrates a bottom perspective view of the upper case of the pouch type battery illustrated in FIG. 2.

FIG. 2 illustrates a vertical sectional view of the pouch type battery according to the second embodiment, and FIG. 7 illustrates a bottom perspective view of the upper case of the pouch type battery illustrated in FIG. 2.

Referring to FIG. 2, the pouch type battery according to the second embodiment may include the pouch type bare cell 100, the protective circuit board 200, an upper case 1300, the first barrier 310, a lower case 1500, and a second barrier 1510.

The pouch type bare cell 100 and the protective circuit board 200 may be substantially the same as those of the previous embodiment, and thus a detailed description thereof will be omitted to avoid repetition.

Along with the lower case 1500, which will be described below, the upper case 1300 may insulate and/or protect the core pack including the bare cell 100 and the protective circuit board 200. The upper case 1300 may support the protective circuit board 200 while encasing an upper portion of the bare cell 100.

The upper case 1300 may include a first side end 1301 (coupled to the second barrier 1510 to be described below) that is located opposite to the terrace 120 with respect to the electrode tab 102. The first side end 1301 provided in the upper case 1300 is shown in FIG. 7 in greater detail.

The first barrier 1310 may protrude downwardly from the upper case 1300 and electrically separates the protective circuit board 200 provided inside the terrace 120 from the electrode tab 102. Thus, the first barrier 1310 provided between the protective circuit board 200 and the electrode tab 102 may help prevent an electrical short between the protective circuit board 200 and the electrode tab 102. The first barrier 1310 provided in the upper case 1300 is shown in FIG. 7 in greater detail.

Along with the upper case 1300, the lower case 1500 may insulate and/or protect the core pack including the bare cell 100 and the protective circuit board 200. The lower case 1500 may encase a lower portion and sides of the bare cell 100. In an implementation, in order to couple the lower case 1500 to the bare cell 100 without using a separate connection unit, the lower case 1500 may be molded into the periphery of the bare cell 100 to then be integrally formed with the bare cell 100.

The second barrier 1510 may protrude upwardly from the lower case 1500, so as to extend between the electrode tab 102 and the first side end 1301 of the upper case 1300. The second barrier 1510 may be is coupled to the first side end 1301 of the upper case 1300. In an implementation, the first side end 1301 of the upper case 1300 and the second barrier 1510 of the lower case 1500 may be coupled to each other by means of a connection unit "C." The connection unit "C" may include a connecting protrusion 1511 formed at the second barrier 1510 of the lower case 1500, and a connecting groove 1302 formed at the first side end 1301 of the upper case 1300. Accordingly, since the upper case 1300 may be fixed to the lower case 1500 molded into the bare cell 100, the upper case 1300 may be securely fixed to the bare cell 100.

Hereinafter, a method of manufacturing the pouch type battery of the second embodiment will be described with reference to FIGS. 3 through 6.

Figure 3:
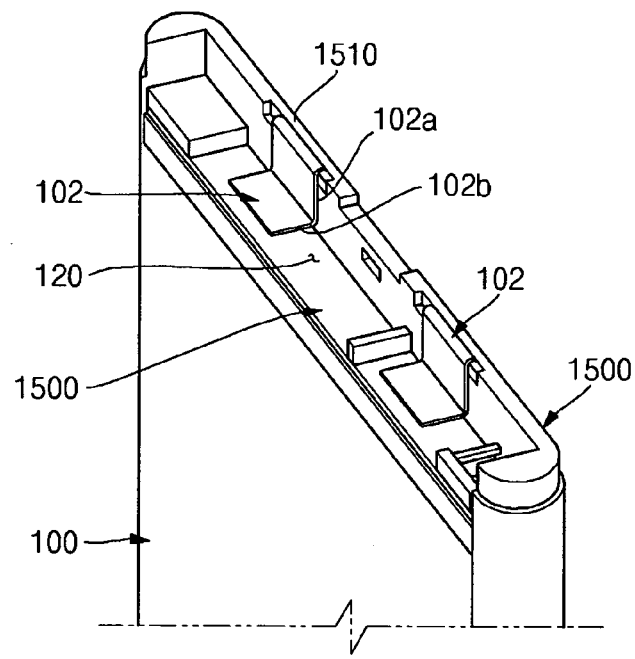
FIG. 3 illustrates a perspective view showing a lower case integrally molded into a bare cell of the pouch type battery illustrated in FIG. 2.
Figure 4:
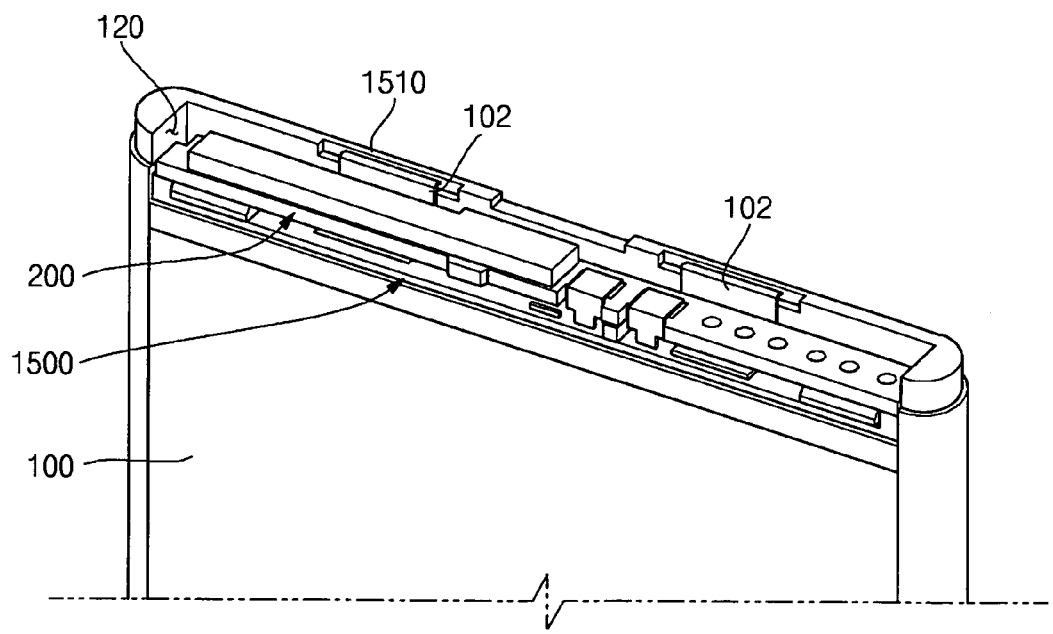
FIG. 4 illustrates a perspective view showing a protective circuit module mounted in a terrace of the bare cell of the pouch type battery illustrated in FIG. 3.
Figure 5:
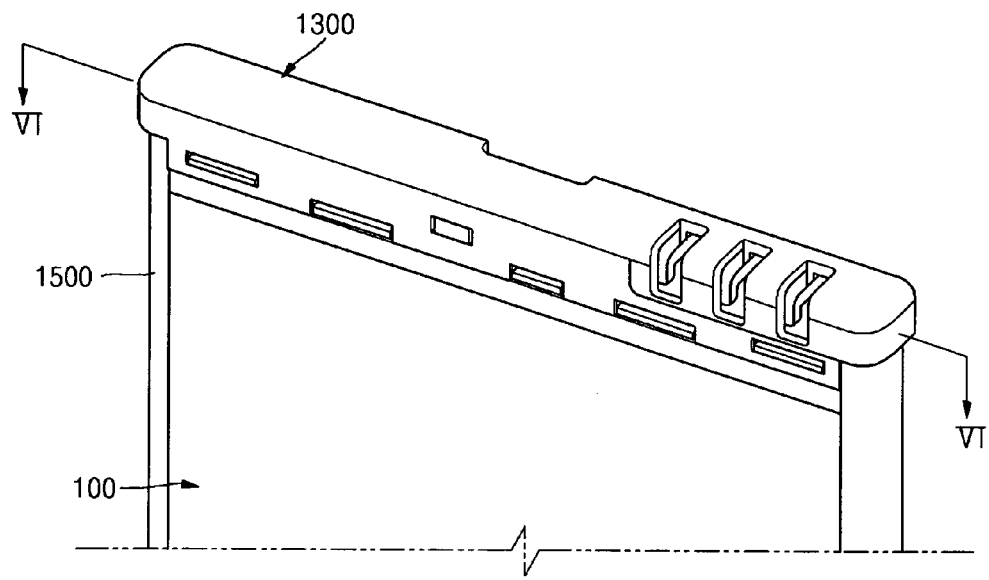
FIG. 5 illustrates a perspective view showing an upper case mounted on the protective circuit module of the pouch type battery illustrated in FIG. 4.
Figure 6:
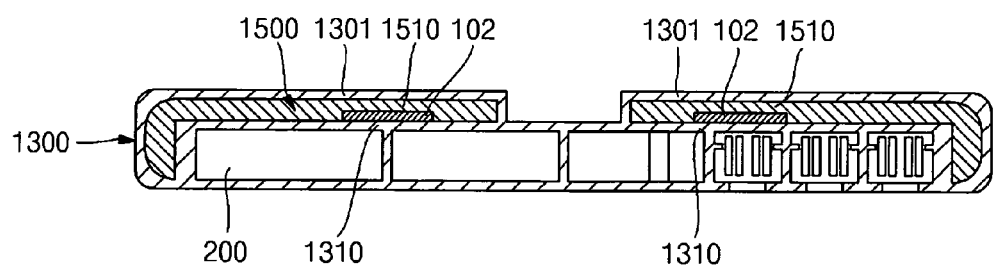
FIG. 6 illustrates a cross-sectional view taken along a line VI-VI of FIG. 5.

FIG. 3 illustrates a perspective view showing a lower case integrally molded into a bare cell of the pouch type battery illustrated in FIG. 2, FIG. 4 illustrates a perspective view showing a protective circuit module mounted in a terrace of the bare cell of the pouch type battery illustrated in FIG. 3, FIG. 5 illustrates a perspective view showing an upper case mounted on the protective circuit module of the pouch type battery illustrated in FIG. 4, and FIG. 6 illustrates a cross-sectional view taken along a line VI-VI of FIG. 5.

First, referring to FIG. 3, the electrode tab 102 may be bent such that it may be placed inside the terrace 120, which is an empty space of the pouch type bare cell 100. Then, the lower case 1500 may be molded into the pouch type bare cell 100 to make the lower case 1500 and the pouch type bare cell 100 integrally formed with each other.

Next, referring to FIG. 4, the protective circuit board 200 may be mounted in the empty space of the bare cell 100, that is, the terrace 120. Here, the connecting portion 202 of the protective circuit board 200 may be connected to the electrode tab 102.

Then, referring to FIG. 5, the upper case 1300 encases the protective circuit board 200 and an upper portion of the bare cell 100. FIG. 6 shows a result of encasing the protective circuit board 200 and an upper portion of the bare cell 100, with the first barrier 1310 of the upper case 1300 positioned between the protective circuit board 200 and the electrode tab 102 so as to prevent an electrical short between the protective circuit board 200 and the electrode tab 102. In addition, referring back to FIG. 2, the casing may also allow the connecting protrusion 1511 of the second barrier 1510 provided at the lower case 1500 to be engaged with the connecting groove 1302 of the first side end 1301 of the upper case 1300.

The pouch type battery according to the example embodiments of the present invention described herein may afford one or more advantages. For example, where a protective circuit board is provided inside a terrace, which is an empty space of a bare cell, the entire length of the pouch type battery may be reduced as compared to the conventional pouch type battery. Consequently, from the viewpoint of miniaturization of an electronic device, batteries that are shortened in their entire lengths may have a much wider range of applicability. Also, a barrier may be provided between a protective circuit board and an electrode tab so that an electrical short between the protective circuit board and the electrode tab may be prevented.

Example embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A pouch type battery, comprising:
   a pouch type bare cell having a terrace and having an electrode tab adjacent to the terrace, the terrace being an empty space defined where a sealing area of the electrode tab is not bent, the sealing area positioned in a direction in which the electrode tab extends;
   a protective circuit board electrically connected to the electrode tab, the protective circuit board positioned in the terrace and including a protection circuit;
   an upper case supporting the protective circuit board and encasing an upper portion of the bare cell; and
   a first barrier protruding downwardly from the upper case and electrically separating the protective circuit board from the electrode tab.

2. The pouch type battery as claimed in claim 1, wherein the bare cell is a polymeric cell using a polymer as electrolyte.

3. The pouch type battery as claimed in claim 2, wherein:
   the bare cell includes an electrolyte contained in a pouch, and
   the electrode tab extends from inside the pouch to outside the pouch, the pouch being sealed around the electrode tab at the sealing area.

4. The pouch type battery as claimed in claim 1, wherein the electrode tab is bent to be electrically connected to the protective circuit board.

5. The pouch type battery as claimed in claim 4, wherein the electrode tab bends downward so as to fold back toward a bottom of the terrace, and bends sideways so as to extend along the bottom of the terrace.

6. The pouch type battery as claimed in claim 1, further comprising:
   a lower case encasing a lower portion and sides of the bare cell; and
   a second barrier protruding upwardly from the lower case so as to be located between the electrode tab and a first side end of the upper case, wherein the second barrier is coupled to the first side end of the upper case, the first side end of the upper case being located opposite to the terrace with respect to the electrode tab.

7. The pouch type battery as claimed in claim 6, wherein the lower case is molded into the periphery of the bare cell to be integrally formed with the bare cell.

8. The pouch type battery as claimed in claim 6, wherein the electrode tab bends downward so as to fold over an extending portion of the lower case and back toward a bottom of the terrace, and bends sideways so as to extend along a surface of the lower case and along the bottom of the terrace.

9. The pouch type battery as claimed in claim 8, wherein the electrode tab includes a bend of about 180 degrees where it bends downward, and the second barrier protrudes upwardly to a height that is greater than a height of the electrode tab at the bend of about 180 degrees.

10. The pouch type battery as claimed in claim 9, wherein the upper case covers an uppermost portion of the second barrier.

* * * * *